US008995703B2

(12) United States Patent
Ilkorur

(10) Patent No.: US 8,995,703 B2
(45) Date of Patent: Mar. 31, 2015

(54) MAGNETIC MOTOR SYSTEM

(75) Inventor: Onur Ilkorur, Dendermonde (BE)

(73) Assignee: PSS Belgium N.V., Dendermonde (BE)

( * ) Notice: Subject to any disclaimer, the term of this patent is extended or adjusted under 35 U.S.C. 154(b) by 0 days.

(21) Appl. No.: 14/111,895

(22) PCT Filed: Apr. 5, 2012

(86) PCT No.: PCT/IB2012/000804
§ 371 (c)(1),
(2), (4) Date: Oct. 15, 2013

(87) PCT Pub. No.: WO2012/140505
PCT Pub. Date: Oct. 18, 2012

(65) Prior Publication Data
US 2014/0037127 A1    Feb. 6, 2014

(30) Foreign Application Priority Data
Apr. 15, 2011    (GB) .................... 1106489.6

(51) Int. Cl.
*H04R 9/02*     (2006.01)
*H02K 41/035*   (2006.01)
*H04R 3/02*     (2006.01)
*H02K 33/18*    (2006.01)

(52) U.S. Cl.
CPC ............. *H04R 9/02* (2013.01); *H02K 41/0356* (2013.01); *H04R 3/02* (2013.01); *H02K 33/18* (2013.01)
USPC ........... 381/400; 381/396; 381/412; 381/414; 381/421

(58) Field of Classification Search
CPC .......... H04R 9/02; H04R 9/025; H04R 9/027; H04R 2209/022; H04R 1/02; H04R 1/06; H02K 33/00; H02K 33/18; H02K 35/04; H02K 35/06; H02K 21/00
USPC ................. 381/150, 396, 190, 400, 412, 414, 381/419–421; 310/10, 12.16, 12.24–12.26, 310/46, 49.41, 90.5, 103, 152, 154.21, 310/156.01, 156.07
See application file for complete search history.

(56) References Cited

U.S. PATENT DOCUMENTS

| 7,368,838 | B2* | 5/2008 | Binnard et al. ................ 310/15 |
| 8,111,870 | B2* | 2/2012 | Lemarquand et al. ........ 381/412 |
| 8,355,524 | B2* | 1/2013 | Saitou et al. .................. 381/421 |
| 8,447,063 | B2* | 5/2013 | Chu .............................. 381/396 |
| 2006/0091733 | A1 | 5/2006 | Binnard |
| 2009/0028375 | A1 | 1/2009 | Richoux et al. |

FOREIGN PATENT DOCUMENTS

EP    2114086 A1    11/2009
JP    08223689 A    8/1996

* cited by examiner

*Primary Examiner* — Ahmad F Matar
*Assistant Examiner* — Sabrina Diaz
(74) *Attorney, Agent, or Firm* — Peter A. Nieves; Sheehan Phinney Bass + Green PA

(57) ABSTRACT

A magnetic motor system for driving a loudspeaker voice coil. The system has first and second parts that define a volume for receiving a voice coil. The first and second parts each have a respective permanent magnet with first and second sidewalls that extend in a direction away from the volume. The first sidewall slopes in a direction towards the second sidewall as the sidewalls extend away from the volume. The first and second parts further have respective guide members for channelling lines of magnetic flux in a return path between the permanent magnets.

19 Claims, 12 Drawing Sheets

Fig. 18
Fig. 19
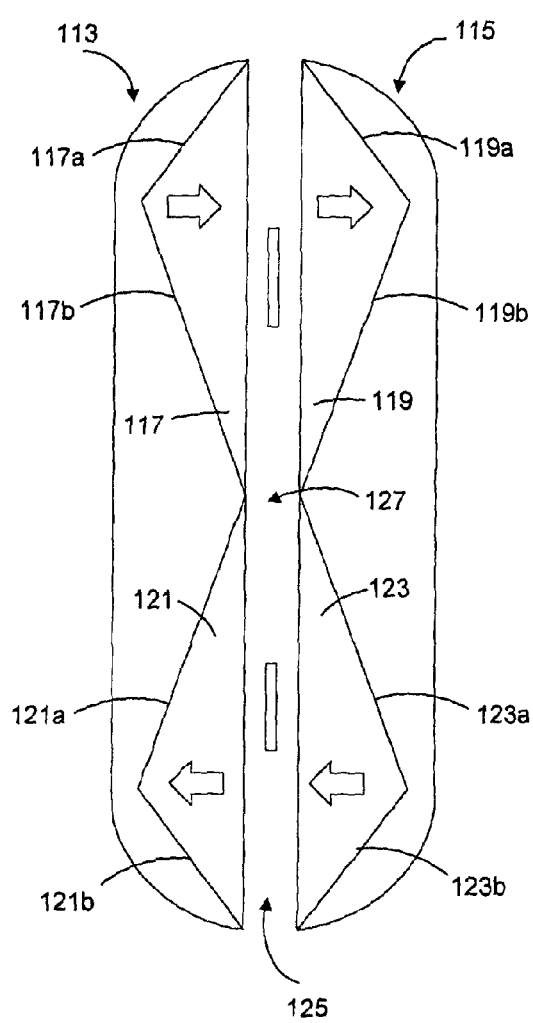
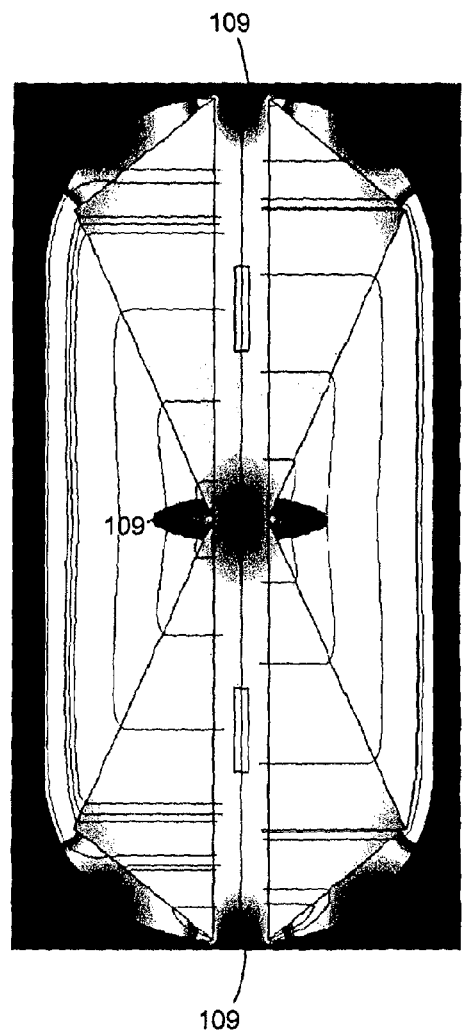

MAGNETIC MOTOR SYSTEM

FIELD OF THE INVENTION

The present invention relates to a magnetic motor system, for example, such as may be used to drive a voice coil in a loudspeaker.

BACKGROUND OF THE INVENTION

Dynamic loudspeakers generally comprise a voice coil element that is positioned in an air gap in a magnetic field generated by one or more permanent magnets. The voice coil includes a current carrying conductor which, upon interacting with the magnetic field, is caused to move at right angles to the direction of the field. The voice coil is connected to a loudspeaker diaphragm such that the mechanical motion of the voice coil is translated to the diaphragm. By varying the current through the voice coil, it is possible to make the voice coil oscillate at different frequencies and so cause the diaphragm to produce sound of different frequencies.

For the loudspeaker to operate efficiently, the magnetic field in the air gap should be as strong as possible. Flux which emanates from the permanent magnets, but which does not contribute to the field experienced by the voice coil is considered as leakage.

In order to maintain a high efficiency, it is necessary to keep flux leakage to a minimum. Typically, therefore, loudspeakers employ ferromagnetic guide members to guide and/or focus the magnetic flux lines that emanate from the permanent magnets towards the air gap.

In some systems, additional permanent magnets are used for the ferromagnetic guide members. Other systems rely on ferromagnetic materials that are not permanent magnets to serve as the guide members.

In general, a guide member that is a permanent magnet can be distinguished from one which is not a permanent magnet by considering the guide member's ability to retain its magnetic properties after a magnetizing field has been removed. A permanent magnet will continue to retain its magnetic energy potential indefinitely after the field is removed. Once magnetised, it is difficult to alter the magnetic energy configuration of the material, or indeed, to demagnetise it altogether.

In addition to permanent magnets, there also exist other ferromagnetic materials, which retain only a small part of their magnetism once the magnetizing force is removed, and whose magnetic energy configuration is easily altered upon subsequent exposure to other magnetic fields. Where a ferromagnetic material ceases to retain its magnetic potential after such a field is removed, that piece of material is not a permanent magnet.

The difference between a permanent magnet and these other types of ferromagnetic material can also be discussed in terms of reluctance. The reluctance of a material defines the opposition that the material offers to magnetic lines of force, as those lines try to distribute themselves throughout the material. Once magnetised, a permanent magnet will have a high reluctance, in the sense that it will oppose any lines of force that are not aligned with its own intrinsic magnetic field. The converse to reluctance is permeability; permeability defines the ease with which magnetic lines of force distribute themselves throughout their material. Therefore, once magnetised, a permanent magnet will display low permeability to magnetic field lines which are not aligned with its own intrinsic magnetic field, whereas other ferromagnetic materials which display low reluctance will have a higher permeability.

An example of a system that uses additional permanent magnets to construct a closed magnetic loop between the two sides of the air gap is provided by US2009/0028375 A1. This document proposes a structure in which several permanent magnets having different placements and polarization orientations are used to channel the lines of magnetic flux in a loop that crosses the air gap.

Such systems suffer from several disadvantages. First, the permanent magnets are typically made from rare earth materials, which are both heavy and expensive. The use of additional permanent magnets to guide the magnetic flux therefore has both cost and weight implications for the magnetic structure.

Secondly, in the systems described above, the magnetic flux lines must, at several points in the loop, cross an interface between two permanent magnets that are magnetised in different directions to one another. As discussed above, the permanent magnets offer high reluctance to lines of flux that are not aligned with their intrinsic magnetic field. Thus, at the interface between two permanent magnets, the magnetic field lines are forced to undergo a sudden change in direction in order to progress to the next part of the loop. Where such sudden changes occur, it is inevitable that at least some of the magnetic flux will be lost to leakage.

As an alternative to using permanent magnets, other pieces of ferromagnetic material which are not themselves permanent magnets may be used to guide the flux. FIG. 1 shows a closed magnetic circuit in which a steel U-Yoke 1 is used to guide magnetic flux from a magnet 3 to an air gap 5 where a voice coil element 7 is placed, and back to the magnet again.

Steel parts such as the U-yoke described above are not permanent magnets; they do not contribute to the magnetic field strength of the magnet structure. They are, one might say, passive components in a magnet system, in which the permanent magnet is the source of energy. Rather than having their own intrinsic direction of magnetisation, the steel parts can adjust their magnetic configuration to accommodate lines of magnetic flux emanating from other parts of the system (in this case, the permanent magnet 3).

FIG. 2 shows a magnetic circuit representation of the circuit shown in FIG. 1 (note this analogy doesn't take saturation of the ferromagnetic materials into calculation). In FIG. 2, Fm is the magnetomotive force, Rm is the internal resistance (reluctance) and the air gap is represented by Rg. Since the steel yoke has a higher magnetic permeability than the surrounding air, most of the magnetic flux emanating from the permanent magnet(s) is channelled through the yoke rather than leaking out of the system and away from the air gap. In effect, the steel yoke serves as a low resistance conduit for channelling lines of magnetic flux from one part of the system to another.

By providing a guide member of the type shown in FIG. 2, the lines of magnetic flux can be made to circulate in a loop without having to negotiate the sudden changes in the magnetic environment that are present at the interface between permanent magnets. Nonetheless, if the geometry of the permanent magnets is poorly matched with that of the guide members, it is possible that magnetic flux will not be coupled effectively into the guide members, and will instead leak out of the system, or shortcut back to the permanent magnets. Where such losses occur, they reduce the overall field strength experienced by the voice coil, causing the performance of the loudspeaker to deteriorate.

In general, there is a continuing need to develop magnetic motor systems that provide enhanced magnetic field strength in the region of the voice coil.

SUMMARY OF THE INVENTION

According to a first aspect of the present invention, there is provided a magnetic motor system for driving a loudspeaker voice coil, the permanent magnetic motor system having:
- a first part and a second part,
- wherein the first and second parts are spaced apart to define a volume between the first and second parts for receiving a voice coil, the voice coil being movable along a voice coil axis,
- the first and second parts each having a respective permanent magnet,
- the permanent magnets having respective faces that face towards one another across the volume,
- the permanent magnets being arranged with opposite poles facing one another across the volume, such that lines of magnetic flux pass across the volume from the face of one permanent magnet to the face of the other permanent magnet,
- each permanent magnet having first and second sidewalls that extend in a direction away from the volume, and which form upper and lower faces of the permanent magnet when the system is oriented with the voice coil axis being vertical,
- wherein the first sidewall slopes towards the second sidewall in a direction away from the volume,
- the first and second parts each having a respective guide member for channelling lines of magnetic flux in a return path from one permanent magnet to the other,
- wherein the guide members are not permanent magnets.

The present invention provides a magnetic motor system with an enhanced geometry for channelling lines of magnetic flux from one side of the volume to the other.

In general, lines of magnetic flux will seek to travel from one pole to another using the shortest distance and easiest route possible. The magnetic flux lines will tend not to follow paths that include sudden changes in direction.

In the present invention, the sloping sidewalls of the permanent magnets permit lines of magnetic flux to pass through the guide members along a trajectory that reduces the probability of magnetic shortcuts occurring in the system. For example, the geometry of the permanent magnets means that lines of magnetic flux that emanate from a first one of the permanent magnets can be channelled through the respective guide member along a path whose curvature is such that, upon arriving at the volume, it is more favourable for the lines of magnetic flux lines to continue across the volume and towards the second permanent magnet, than it is for the lines to shortcut back to the first permanent magnet.

In this way, the geometry of the permanent magnets may help to conserve the strength of the magnetic field between the two permanent magnets in which the voice coil is immersed. Since the present invention does not require the use of additional permanent magnets to guide the magnetic flux lines, the cost and weight of the magnetic motor system can be reduced whilst still ensuring a high flux density inside the volume where the voice coil is received.

The upper and lower faces defined by the first and second sidewalls may be curved towards one another. For example, the upper and lower faces may form part of a single, continuously sloped surface. For example, when seen a cross sectional plane defined by the voice coil axis, and a second axis that extends perpendicularly to the voice coil axis and normal to one of the faces of the permanent magnets, the permanent magnets may define the shape of a semicircle, or half-ellipse. In this instance, the portions of the surface that lie above and below the horizontal can be considered to be upper and lower faces, respectively.

The magnetic motor system may have any one or any combination of the following optional features.

Preferably, the permanent magnets are polarized perpendicularly to the voice coil axis. The permanent magnets may be magnetised along an axis that is perpendicular to the voice coil axis.

Preferably, the guide members are formed from a ferromagnetic material whose magnetic permeability is such that the ferromagnetic material will adopt a magnetic configuration determined by the magnetic field of the permanent magnets, regardless of any previous magnetic configuration of the guide members.

For the purposes of the present application, it is intended to distinguish the material of the guide members from the material of the permanent magnets by reference to the behaviour of these materials inside the loudspeaker assembly. The permanent magnets are formed of a ferromagnetic material that once magnetised by an external magnetising field, will then retain its magnetisation, regardless of exposure to fields emanating from other parts of the loudspeaker assembly. In contrast, the guide members are formed of a different material, wherein, even if that material is pre-magnetised before assembly inside the loudspeaker, the material will, on being assembled in the loudspeaker, adjust its magnetic configuration to accommodate magnetic fields emanating from other parts of the loudspeaker assembly. In particular, the magnetic permeability of material of the guide members is such as to allow the material to adjust its magnetic configuration to accommodate the field of the permanent magnets. The guide members may, therefore, offer low reluctance (or high permeability) to magnetic flux emanating from the permanent magnets.

Thus, a ferromagnetic guide member as described herein may cover any piece of ferromagnetic material whose permeability is such that the material can adjust its magnetic configuration to accommodate magnetic flux emanating from the permanent magnets inside the loudspeaker.

Preferably, the first and second side walls of each permanent magnet are not perpendicular to the voice coil axis. By providing upper and lower faces that are both inclined by an acute (i.e. less than 90 degree) angle with respect to the voice coil axis, lines of magnetic flux that enter and/or leave the permanent magnets can be channelled along a more optimal trajectory that reduces the occurrence of flux leakage and or magnetic shortcuts.

When the system is viewed in a cross sectional plane defined by the voice coil axis and a second axis that extends from and is normal to the face of one of the permanent magnets, the first sidewall of each permanent magnet may be inclined at an angle of between 45 and 75 degrees with respect to the second axis. The second sidewall of each permanent magnet may also be inclined at an angle of between 45 and 75 degrees with respect to the second axis.

When the system is viewed in this cross sectional plane, the permanent magnets may be substantially trapezium or triangular shaped.

Each guide member may have a first portion that abuts the first sidewall of the permanent magnet, so as to form an interface between the guide member and the first sidewall. Each of the guide members may further have a second portion that abuts the second sidewall of the permanent magnet, so as to form an interface between the guide member and the second sidewall. Here the term "interface" is intended to cover not only arrangements in which the surfaces of the sidewalls and guide members are in direct contact with one another, but ones in which they are separated, for example, by a thin layer of adhesive.

The surface area of the interface formed between the guide member and the first sidewall of the permanent magnet may be equal to or larger than the surface area of any other interface formed between a wall of the permanent magnet and the guide member.

Alternatively, the respective interfaces formed between the guide member and the first and second sidewalls may have a combined surface area that exceeds the surface area of any other interface formed between a wall of the magnet and the guide member.

Where the sidewalls are sloped with respect to the voice coil axis, lines of magnetic flux returning along the flux return path can enter and leave the permanent magnets directly through the sidewalls, thereby reducing the distance the magnetic flux lines must travel in order to complete a loop between the poles of the permanent magnets. In addition, lines of magnetic flux that pass through the sloped walls can be channelled along a more optimal trajectory that helps to reduce the occurrence of flux leakage and or magnetic shortcuts in the system.

Where the first and/or second sidewalls provide the largest surface area of interface between the permanent magnet and the guide member, this helps to ensure that the majority of magnetic flux channelled along the return path passes through the first or second sidewall of the permanent magnet, and so is channelled along a more optimal trajectory within the guide members.

The first and second side walls may have a combined surface area that forms a majority of the total surface area of the permanent magnet.

The gradient of the slope of the first and second sidewalls may be constant. Where the gradient of the slope(s) is constant, lines of magnetic flux that enter or leave the permanent magnets through different regions of the first and second sidewalls can be made to follow substantially parallel trajectories. Thus, lines of magnetic flux passing through different regions of the first and second sidewalls may each be channelled along similar trajectories that help to reduce the occurrence of flux leakage and or magnetic shortcuts.

The guide members may have recessed portions for receiving an adhesive to bond the permanent magnets to the guide members.

The first and second portions of each guide member may be discrete elements. When assembled in the system, the respective first and second portions of each guide member may define a gap between them. The gap may be used, for example, to allow excess adhesive used in the bonding process to escape from the system.

The permanent magnets may be encased within the guide members. Encasing the permanent magnets in the guide members can help maximise the surface area of the interface between the guide members and the first and second sidewalls of the permanent magnets, and so reduce flux leakage as flux passes between the permanent magnets and guide members.

The first portions of each guide member may be arranged to channel lines of magnetic flux in a first return path between the first side walls of each pair of facing permanent magnets.

The second portions of each guide member may be arranged to channel lines of magnetic flux in a second return path between the second side walls of each pair of facing permanent magnets.

The magnetic flux lines channelled through the first and second portions of the guide members may form two separate magnetic flux loops between the two sides of the volume. The first and second return paths may cross the volume on opposite sides of the magnetisation axis of the permanent magnets.

Preferably, a voice coil is received within the volume. The voice coil may be movable along the voice coil axis between two extremes, wherein, at a midway point between the two extremes, the voice coil is situated between the opposing poles of the permanent magnets. The voice coil may intersect with the first and second flux return paths at the respective extremes. As the voice coil approaches one of the extremes of its range of motion, it may encounter a first one of the flux return paths, meaning that the voice coil becomes immersed in a magnetic field whose direction is opposite to that in which the voice coil is immersed when at its central position directly between the poles of the two permanent magnets. Such an arrangement provides an advantage in that it precludes the need for a mechanical stop in order to halt the motion of the voice coil as it moves along the voice coil axis. As the magnetic field gradually changes direction, the force exerted on the coil thereby also gradually changes direction, causing the voice coil to decelerate smoothly and begin moving in the opposite direction back towards the mid-point of its range of movement. The same effect may also occur at the opposite extreme, when the voice coil encounters the second flux return path.

The first and second parts may define inner and outer ring members arranged coaxially about the voice coil axis. The volume may be an annular volume between the ring members.

The permanent magnets may be ring permanent magnets. Using ring magnets may be convenient where the magnetic motor system has a circular geometry.

The permanent magnet in the first part may be one of a plurality of circumferentially spaced permanent magnets in the inner ring member. The permanent magnet in the second part may be one of a plurality of circumferentially spaced permanent magnets in the outer ring member. Each permanent magnet in the inner ring member may be arranged facing a respective permanent magnet in the outer ring member across the volume.

Alternatively, the first and second parts may be planar members. The members may have opposing surfaces that form the walls of the volume. The opposing surfaces may each extend in a single, respective plane.

Preferably, when the system is viewed in the cross sectional plane, each permanent magnet has a longest side that runs parallel with the voice coil axis.

The first and second parts may each contain a respective second permanent magnet. The second permanent magnets may be arranged with opposite poles facing one another across the volume.

The second permanent magnets may be magnetised in an opposite direction to the first permanent magnets. The second permanent magnets may be arranged such that lines of magnetic flux channelled along the return path pass across the volume between the second permanent magnets.

The second permanent magnets may each have first and second side walls that extend in a direction away from the volume, and which define upper and lower faces of the second permanent magnets when the system is oriented with the voice coil axis being vertical. The first sidewall of each second permanent magnet may slope towards the second sidewall of the respective second permanent magnet in a direction away from the volume.

Preferably, the first and second side walls of the second permanent magnets are not perpendicular to the voice coil axis (i.e. they are inclined by an acute angle with respect to the voice coil axis).

When the system is viewed in the cross sectional plane, the first and second sidewalls of each permanent magnet may be inclined at an angle of between 45 and 75 degrees with respect to the second axis.

The first and second sidewalls of each permanent magnet may be inclined at the same angle with respect to the second axis. Alternatively, the first and second sidewalls of each permanent magnet may be inclined at different angles with respect to the second axis.

The permanent magnets may be neodymium magnets. Using neodymium magnets can help to minimise the weight of the permanent magnets, whilst still ensuring a powerful magnetic field from the permanent magnets.

Alternatively, the permanent magnets may be made from samarium cobalt, for example, or other suitable materials, for example Ferrite.

Preferably, the first and second parts are wholly separated by the volume. By ensuring that the guide members are wholly separated by the volume (rather than being linked, for example, by a ferromagnetic bridge across the two sides of the volume) it may be possible to ensure that flux passing along the return path passes back through the volume, thereby helping to maximise the flux density within the volume. In addition, since no additional ferromagnetic material is required to bridge the gap between the guide members, the overall weight of the magnetic motor system may be reduced.

The guide members may be symmetrical about the magnetisation axis of the permanent magnets.

According to a second aspect of the present invention, there is provided a loudspeaker having a magnetic motor system according to the first aspect of the present invention.

In some cases, the first part and the second part each contain a single permanent magnet only. In such cases, when the system is in its final configuration, each permanent magnet in the system may be magnetised in the same direction. This may include the case, for example, where the permanent magnets are ring magnets, or where the first and second parts are planar members, having a single pair of facing permanent magnets. In such arrangements, it may be possible to perform single step magnetisation of the system after assembly of the first and second parts, by placing the system in an external magnetic field. As explained above, once magnetised by the external magnetic field, the permanent magnets will remain magnetised in the direction of that field, even after the field is removed. The guide members may also become magnetised in the direction of external field while that field is present. However, upon removal of the external field, the guide members will cease to retain the same magnetic configuration, but will adjust their configuration to accommodate the magnetic fields emanating from the permanent magnets.

Thus, in the arrangements described above, it may be possible to perform post-assembly magnetization of the system as a whole, rather than, for example, having to pre-magnetize the permanent magnets prior to assembly of the first and second parts. Performing a single end of line step of magnetisation can be advantageous by reducing the complexity and cost involved in manufacture of the system.

Thus, according to a third aspect of the present invention, there is provided a method of manufacturing a magnetic motor system according to the first aspect of the present invention, the method including providing the first and second parts, spacing the first and second parts apart to define the volume for receiving a voice coil, and placing the first and second parts in an external permanent magnetic field, such that the permanent magnets will become permanent magnetised in the same direction.

In manufacturing a magnetic motor system according to the present invention, the intended range of motion of the voice coil along its axis may be used to determine the distance that the permanent magnets extend along that axis. Once this distance is known, the thickness of the guide members can be calculated by deciding if a) the guide members are to fully encase the permanent magnets, and b) the gradient of slope of the first and/or first and second sidewalls of each permanent magnet. Once the geometry of the permanent magnets is defined, the guiding parts may be built around the permanent magnets.

BRIEF DESCRIPTION OF THE DRAWINGS

Embodiments of the invention will now be described by way of example with reference to the accompanying drawing in which:

FIG. 18 shows a magnetic motor assembly according to another embodiment of the present invention; and FIG. 19 shows a calculated magnetic flux density map for a magnetic motor system having the structure shown in FIG. 18.

DETAILED DESCRIPTION

Figure 3:
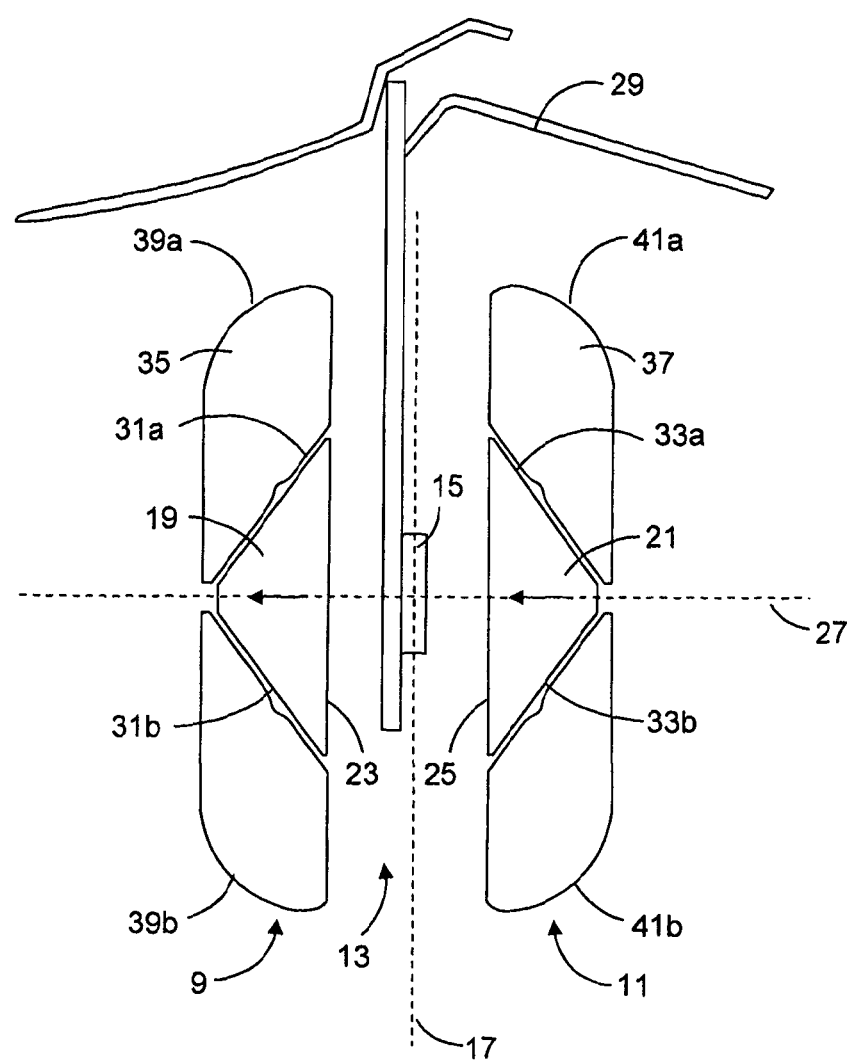
FIG. 3 shows a cross section through a magnetic motor system according to an embodiment of the present invention.

FIG. 3 shows a cross section through a magnetic motor system according to a first embodiment of the present invention.

The magnetic motor system has first 9 and second 11 parts, which are spaced apart by an air gap 13, for example. A voice coil element 15 is received in the gap, and is movable along a voice coil axis. In FIG. 3, the system is shown in an orientation in which the voice coil axis extends vertically, however, when in use the system may be oriented in any direction. The first and second parts each have respective permanent magnets 19, 21. The permanent magnets have respective faces 23, 25 that face towards one another across the air gap, for example.

In this example, the permanent magnets are magnetised in the same direction as one another. The magnets are, for example, magnetised in a direction along a second axis 27 that extends perpendicularly to the voice coil axis, and which passes normal to the face of one of the permanent magnets. For example, the permanent magnet 19 in the first part is arranged with its south pole closest to the air gap. The permanent magnet 21 in the second part is arranged, for example, with its north pole closest to the air gap. In this arrangement, for example, lines of magnetic flux pass across the air gap from one face to the other.

The voice coil element is immersed in the magnetic field produced by the permanent magnets. By varying the current passing through the coil, it is possible to generate a force that causes the voice coil element to move along the voice coil axis. The voice coil element has an end that is coupled, for example, to a loudspeaker diaphragm 29, so that the motion of the voice coil element will cause the diaphragm to oscillate, and produce sound of varying frequencies.

Each permanent magnet has first 31*a*, 33*a* and second 31*b*, 33*b* sidewalls that extend in a direction away from the volume. In the orientation shown in FIG. 3, in which the voice coil axis extends in the vertical direction, the first and second sidewalls form upper and lower faces of the permanent magnets. In this example, the first and second sidewalls of each permanent magnet slope towards one another in a direction away from the air gap. Thus, the upper and lower faces of the permanent magnets are inclined with respect to the second axis 27 that runs perpendicularly to the voice coil axis.

The first and second parts have respective guide members 35, 37. The guide members are arranged to channel lines of magnetic flux in a return path from one permanent magnet to the other.

The guide members in the first and second parts are, for example, wholly separated by the volume. For example, there is no ferromagnetic material linking the two sides of the volume. In order for flux to pass from one guide member to the other, it may be necessary for the flux to pass through the volume.

The guide members are formed of a ferromagnetic material, for example steel, that does not exhibit a permanent magnetic moment, but which nonetheless can become magnetised when placed in proximity to the permanent magnets. The ferromagnetic material of the guide members is highly permeable to magnetic flux emanating from the permanent magnets. Since the permeability of the guide members is higher than the surrounding air, the magnetic flux lines of the permanent magnets 19, 21 prefer to flow through the guide members than leak into the surrounding air. The guide members do not themselves contribute to the magnetic field strength of the magnet structure, however. They can be considered as passive components in the magnetic system, in which the permanent magnets provide the source of energy. When exposed to the magnetic field of the permanent magnets, the guide members may adopt a magnetic configuration such as to guide the lines of magnetic flux from one side of the volume to the other. The guide members may help to create a short closed loop of magnetic flux lines to improve the efficiency of the magnet motor. The guide members extend along the voice coil axis. The guide members have ends 39*a*, 39*b*, 41*a*, 41*b* for example, that curve example, towards the air gap. The curvature of the guide members in turn may help, for example, to channel the lines of magnetic flux in a curved path between the permanent magnets.

Figure 4:
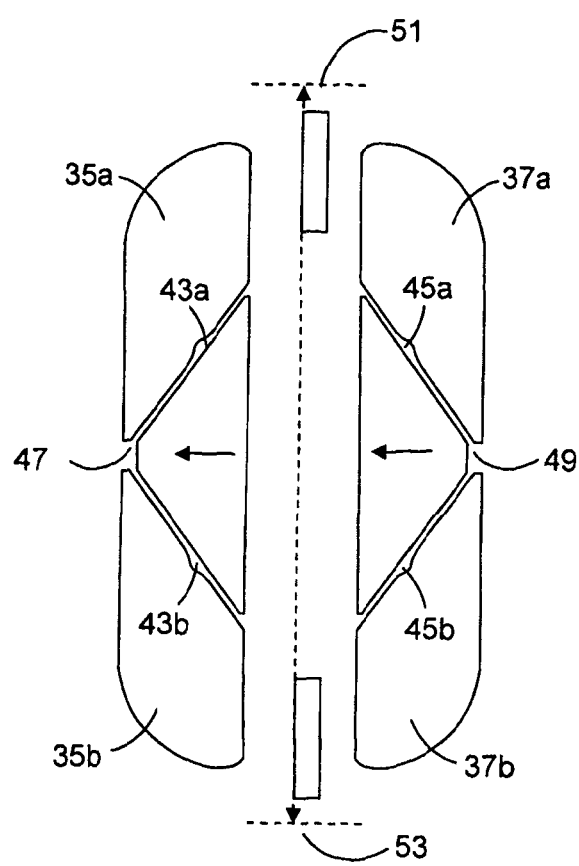
FIG. 4 shows a cross section through a magnetic motor system according to an embodiment of the present invention.

FIG. 4 is a simplified view of the system shown in FIG. 3, in which further features of the magnetic motor system are depicted. As shown in FIG. 4, each guide member has, for example, a first portion 35*a*, 37*a* and a second portion 35*b*, 37*b*. The first portion of each guide member forms an interface, for example, with the first sidewall of the respective permanent magnet. The second portion of each guide member forms an interface, for example, with the second sidewall of the respective permanent magnet.

At the interface between each portion of the guide members and the sidewalls of the permanent magnets, the guide members have a recessed portion 43*a*, 43*b*, 45*a*, 45*b*, for example. The recessed portion may be in the form of a groove or channel, for example. During manufacture, adhesive may be applied to the recessed portion, for example, as a means for bonding the guide members to the permanent magnets.

In this example, the first and second portions of each member are not contiguous with one another, but are separated from one another by a gap 47, 49 at the side of the permanent magnets that is furthest from the volume. The gap may, for example, provide an outlet through which any excess adhesive can drain away from the magnets during the bonding process.

In the example shown in FIG. 4, the voice coil is moveable along the axis between two extremes 51, 53 that lie, for example, beyond the opposing faces of the permanent magnets. When at one or other of the extremes, at least part of the voice coil may, for example, lie between the parts of the guide members that face directly towards one another across the volume. At the extremes, the voice coil may intersect with lines of magnetic flux being channelled across the air gap by the guide members.

Figure 5:
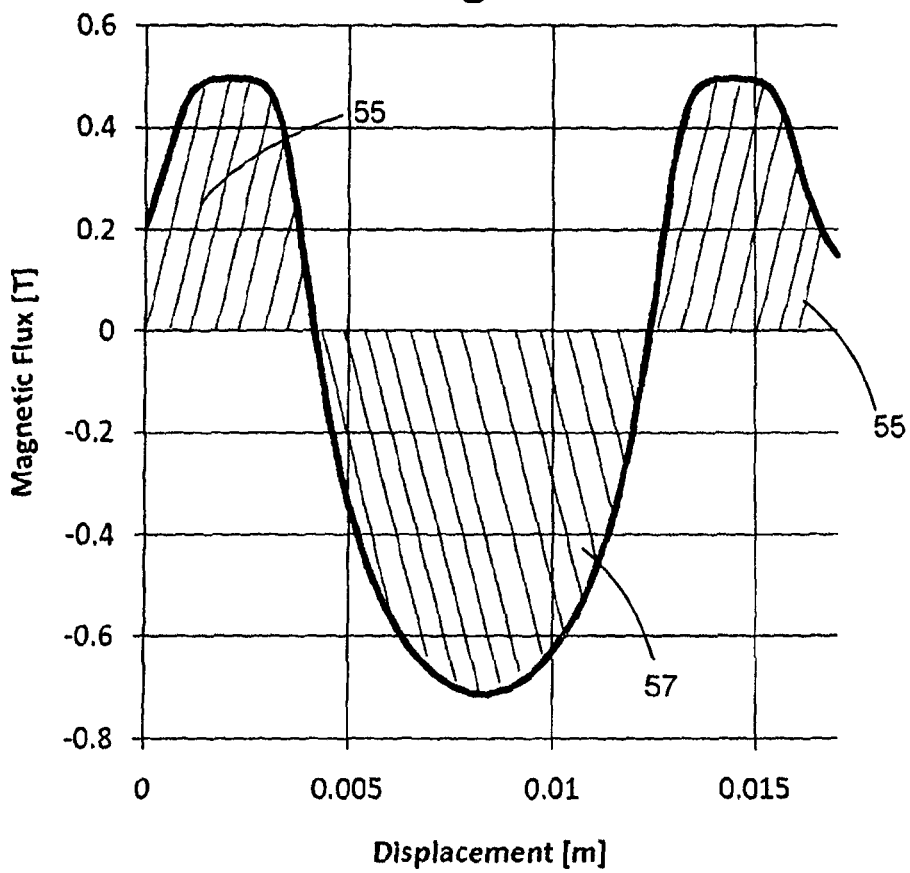
FIG. 5 is graph showing how the magnetic flux experienced by the voice coil varies as the voice coil moves along its axis of motion in one embodiment of the present invention.
Figure 15:
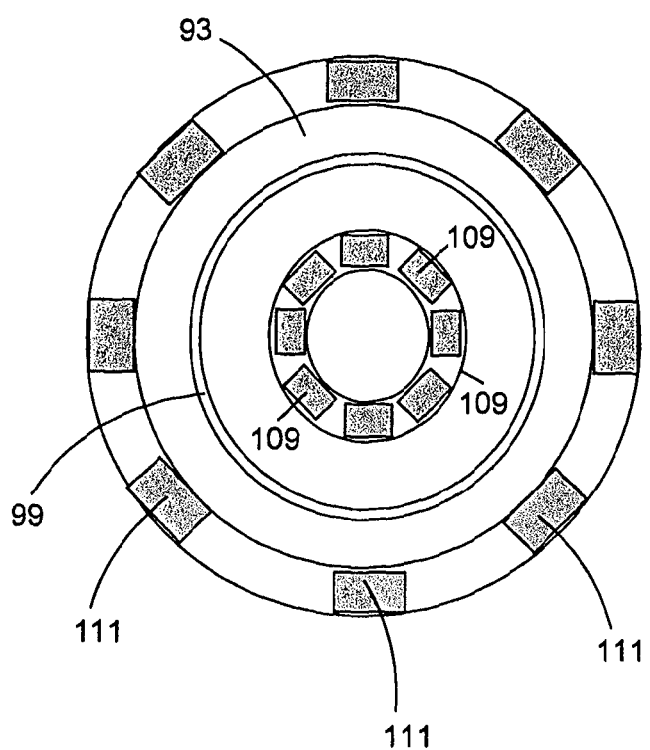
FIG. 15 shows a plan view of a magnetic motor system according to another embodiment of the present invention.

FIG. 5 shows how the magnetic flux experienced by the voice coil varies as the voice coil moves along its axis of motion between the two extremes. The graph shown in FIG. 15 has two important regions 55, 57. In these regions the direction of the magnetic field is reversed (i.e. the flux flow is in opposite directions). The central region 57 of the graph may, for example, correspond to the mid-point of the voice coil's range of movement. Here, the current carrying conductor of the voice coil may be situated directly between the opposing poles of the permanent magnets.

When the voice coil is in the central region, it experiences an initial force vector that moves it along the voice coil axis. As the voice coil continues to move along the axis, it gradually begins to encounter the lines of magnetic flux that are being guided back across the volume by the guide members. The polarity of the magnetic flux passing across the volume in the return path is the reverse of that passing directly between the two poles of the magnet that the voice coil experiences when in its central position.

Conventional speakers rely on a mechanical stop to decelerate the voice coil as it reaches the extremes of its range of movement. Alternatively, the voice coil may be suspended by a suspension means which is stretched to a maximum at the point where the voice coil reaches the extreme end of its range of motion. Both of these alternatives result in an effect known as "bottoming" which is unpleasant to the ear.

Figure 6:
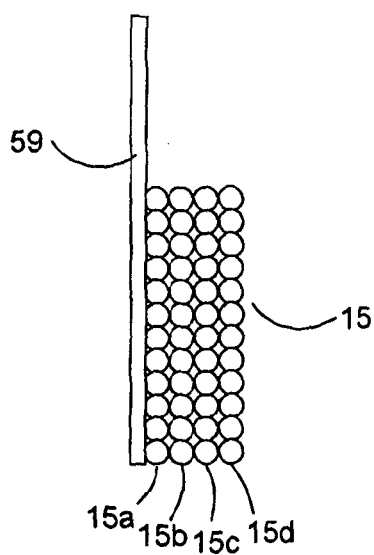
FIG. 6 shows a voice coil suitable for use in a magnetic motor system of the present invention.

In contrast, in the example shown in FIG. 4, as the voice coil approaches one of the extremes of its range of motion, it encounters the flux return path, meaning that the voice coil becomes immersed in a magnetic field whose direction is opposite to that in which the voice coil is immersed when at its central position directly between the poles of the two permanent magnets. As the magnetic field gradually changes direction, the force exerted on the coil thereby also gradually changes direction, causing the voice coil to decelerate smoothly and begin moving in the opposite direction back towards the mid-point of its range of movement. The present invention therefore provides an advantage in that it reduces or even eliminates entirely the phenomenon known as "bottoming" that occurs in conventional loudspeakers. FIG. 6 shows an example of a voice coil suitable for use in the magnetic motor system. The coil itself may be borne on a mandrel 59, for example. The voice coil 15 has multiple layers 15a, 15b, 15c, 15d of electrical conductor, for example, copper wire, that carry current in a direction perpendicular to the lines of magnetic flux that pass between the opposing faces of the permanent magnets.

Figure 7:
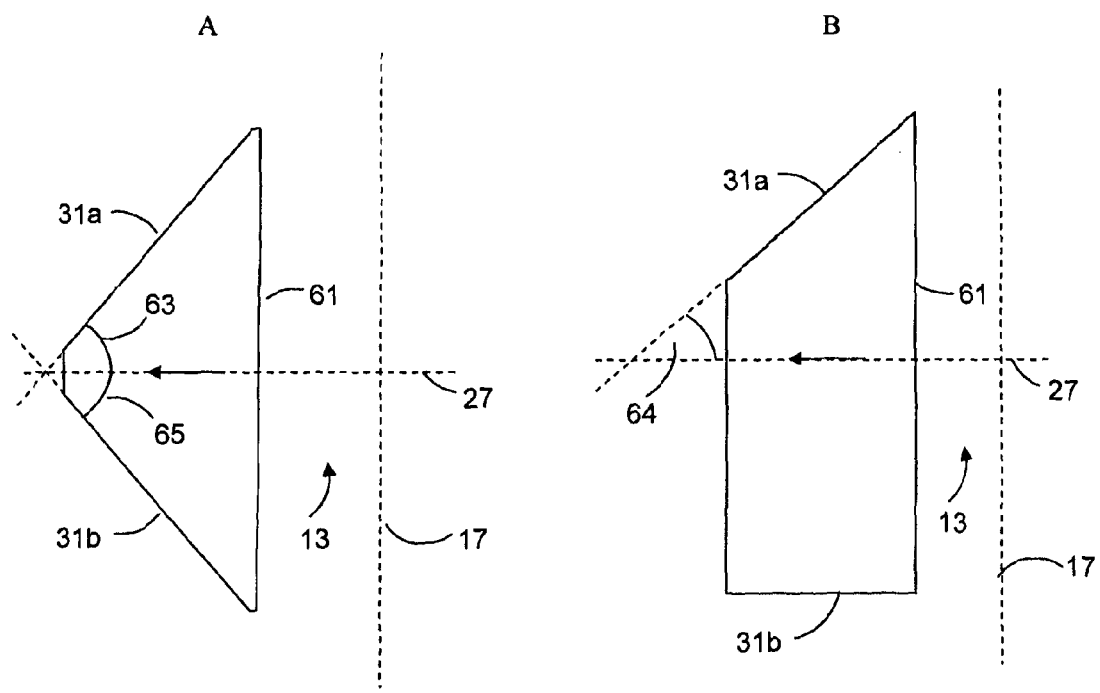
FIG. 7 shows example geometries for permanent magnets used in the present invention.
Figure 7:
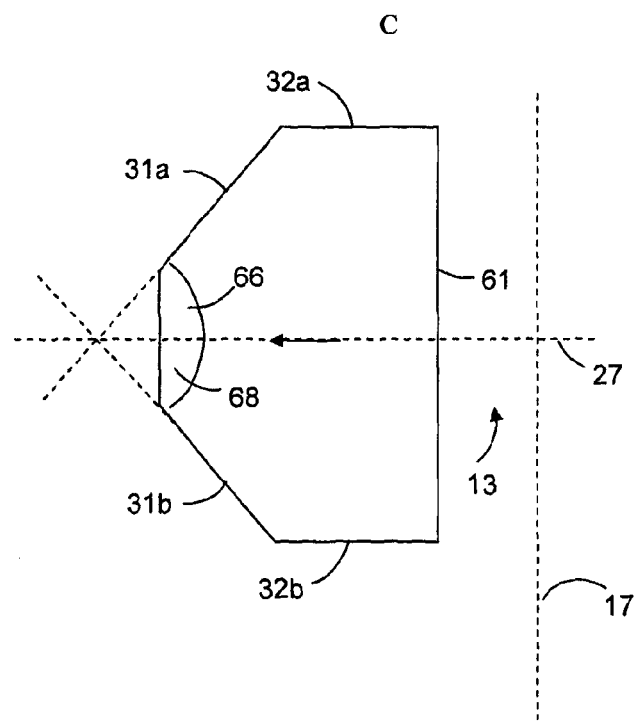

FIG. 7 shows examples of possible geometries for the permanent magnets used in the present invention, as viewed in a cross sectional plane defined by the voice coil axis 17 and a second axis 27 that extends perpendicular to the voice coil axis. The second axis extends normal to the first face of one of the permanent magnets.

Each one of the permanent magnets shown in FIGS. 7a, 7b, and 7c has a longest side 61 which corresponds to the first face of the magnet. The first face of each permanent magnet may, for example, extend in a direction parallel with the voice coil axis 17. In this case, the longest side 61 will also extend parallel with the voice coil axis.

Each permanent magnet has first 31a and second 31b sidewalls that extend in a direction away from the volume 13. In each case, the first sidewall 31a slopes towards the second side wall 31b as the first sidewall extends away from the volume. The first sidewall 31a does not extend perpendicularly to the voice coil axis, but is inclined by an acute angle with respect to the voice coil axis.

In the example shown in FIG. 7a, the first and second sidewalls are both inclined at respective angles 63, 65 to the second axis 27, which extends perpendicularly to the voice coil axis. Thus, in this example, neither the first side wall, nor the second sidewall extend perpendicularly to the voice coil axis. The first and second sidewalls are, for example, inclined by the same angle with respect to the second axis. The size of this angle is, for example 45 degrees.

In the example shown in FIG. 7b, the second sidewall 31b is parallel with the second axis 27. In this example, the second sidewall 31b extends perpendicularly to the voice coil axis 17, but the first sidewall 31a does not extend perpendicularly to the voice coil axis. The first side wall 31a is inclined by an acute angle 64 with respect to the second axis 27.

FIG. 7c shows an example geometry in which the first 31a and second 31b sidewalls do not extend directly from the first face 61 of the permanent magnet, but are spaced apart from the first face by respective walls 32a, and 32b of the permanent magnet. The first and second sidewalls do not, for example, share a common edge with the first face of the permanent magnet.

The walls 32a, 32b extend, for example, in a direction that is perpendicular to the voice coil axis. The first sidewall 31a and its adjoining wall 32a both, for example, define upper faces of the permanent magnet when the system is oriented with the voice coil axis being vertical. The second sidewall 31a and its adjoining wall 32b both, for example, define lower faces of the permanent magnet when the system is oriented with the voice coil axis being vertical.

The permanent magnets are, for example, symmetric about the axis that runs perpendicular to the voice coil axis. The axis of symmetry may, for example, pass through the mid-point of the voice coil's range of movement along the voice coil axis.

Advantages of using a geometry in which the first sidewall of the permanent magnets slopes towards the second sidewall in a direction away from the air gap will now be described with reference to FIGS. 8, 9 and 10. These figures show streamline graphs which may be used to visualize the magnetic fields for magnetic motor systems having permanent magnets with different geometries. The lines shown in each graph are lines of magnetic flux; these lines connect points in space at which the magnetic flux density vector is of the same magnitude. At each point in space, the line passes tangentially to instantaneous vector of the magnetic flux density at that point.

The lines of magnetic flux seek to travel between opposite magnetic poles using the shortest distance and easiest route possible. The magnetic flux lines will tend not to follow paths that include sudden changes in direction.

Figure 8:
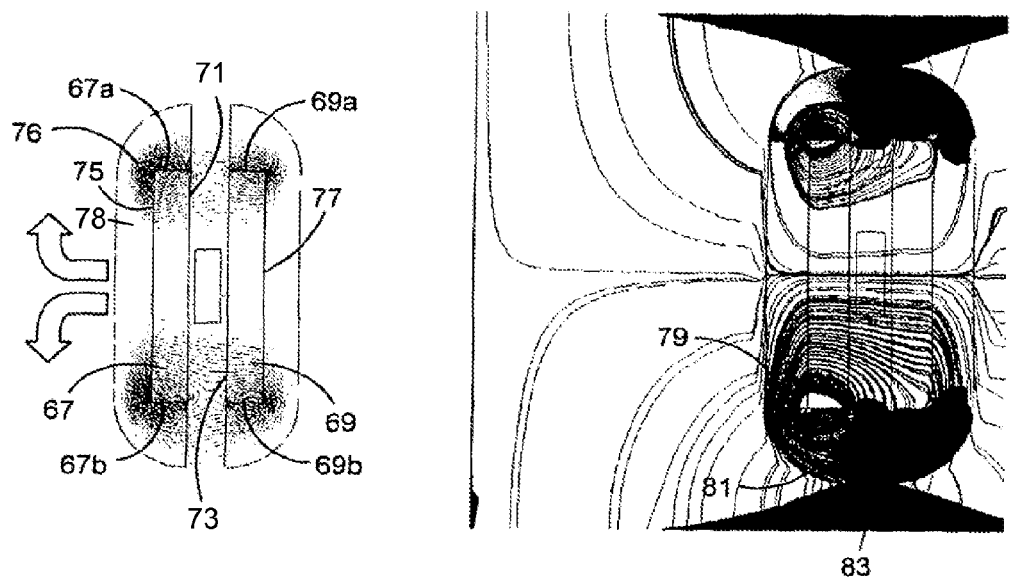
FIG. 8 shows a calculated flux density map for a magnetic motor system using permanent magnets having sidewalls that extend perpendicular to the voice coil axis.

FIG. 8 shows a first arrangement in which the permanent magnets 67, 69 have a rectangular cross section. The permanent magnets are magnetised in the same direction as one another along an axis that extends perpendicularly to the voice coil axis.

The permanent magnets 67, 69 have respective front faces 71, 73 that face towards one another across the volume. The front face 71 of the first permanent magnet 67 is at the south pole of the magnet, and the front face 73 of the second permanent magnet 69 is at the north pole of the magnet.

The permanent magnets have respective rear walls 75, 77 that extend parallel to the voice coil axis. The rear wall 75 of the first permanent magnet lies at the north pole of the magnet. The rear wall 77 of the second permanent magnet lies at the south pole of the magnet.

The permanent magnets further have sidewalls 67a, 67b, 69a, 69b that extend from the front face of the magnet to the rear wall. In both cases, the sidewalls extend perpendicularly to the voice coil axis.

The rear wall 75 of the first permanent magnet abuts the first guide member 78, so as to form an interface through which lines of magnetic flux can pass from the north pole of the permanent magnet into the guide member. An interface is also formed between the sidewalls 67a, 67b, and the guide member. The surface area of the interface formed between the rear wall 75 and the guide member is considerably larger than the surface area of the interface formed between the sidewalls 67a, 67b and the guide member.

Lines of magnetic flux pass across the volume from the north pole 73 of the second permanent 69 magnet to the south pole 71 of the first permanent magnet 67. The guide members in turn channel lines of flux emanating from the north pole 75 of the first permanent magnet along a return path that crosses the volume to reach the south pole 77 of the second permanent magnet.

As shown in the right hand side of FIG. 8, the magnetic flux lines enter the first guide member from the north pole of the second magnet; since the sidewalls extend substantially parallel to the lines of magnetic flux inside the permanent magnet, the lines of magnetic flux do not pass through these sidewalls.

Upon entering the first guide member, the lines are travelling in a direction away from the volume. In order for the lines of magnetic flux to reach the other side of the volume, they must complete a turn within the guide member.

The lines of magnetic flux are, however, precluded from turning directly towards the volume by the geometry of the rectangular permanent magnet, which continues to project into the guide member for its entire length along the voice coil axis. In order to pass round the permanent magnet, the magnetic flux lines are forced to adopt a path 79 that initially curves outwardly, away from the volume. The path curvature is such that, upon arriving at the volume, it is almost as favourable for the magnetic flux lines 81 to continue curving back to the south pole of the first permanent magnet 67, as it is for the lines to continue across the volume towards the second permanent magnet 69. Thus, a significant amount of the energy of the system is dissipated in a magnetic shortcut 83.

Figure 9:
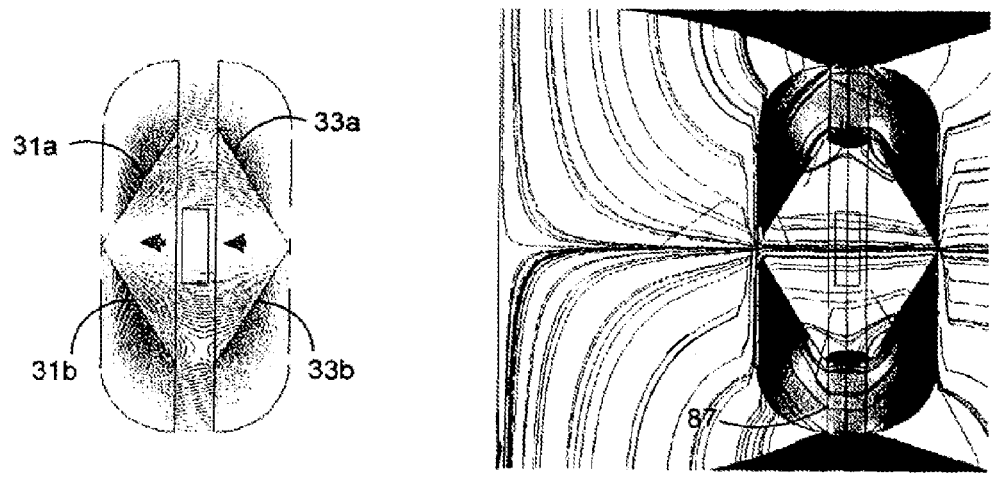
FIG. 9 shows a calculated flux density map for a magnetic motor system according to an embodiment of the present invention.

FIG. 9 shows the case where the permanent magnets have sidewalls that slope towards one another in a direction away from the volume. In this example, the sidewalls converge towards a single edge.

The sloping geometry of the sidewalls means that the lines of magnetic flux leaving the permanent magnet are able to curve directly towards the volume. In so doing, the lines follow a different path curvature to that of the case shown in FIG. 8. Here, the path curvature is such that, upon arriving at the volume, it is less favourable for the lines 87 to shortcut back to the south pole of the second permanent magnet, than it is for the lines to continue across the volume towards the other permanent magnet. Thus, there is a reduction in the energy that is dissipated by magnetic shortcut compared to FIG. 8.

Furthermore, as shown in FIG. 9, the surface area of the interface between the sidewalls of each permanent magnet and their respective guide members accounts for the majority of the surface area of contact between the permanent magnets and the guide members. Thus, in contrast to the case shown in FIG. 8, substantially all the flux passing between the guide members and permanent magnets does so through the first and second side walls. As a result, the magnetic flux lines travel a reduced distance in order to complete a loop between the two sides of the volume.

Figure 10:
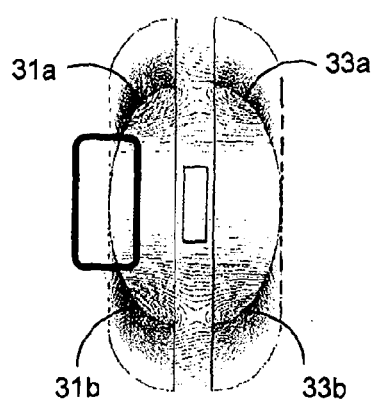
FIG. 10 shows a calculated flux density map for a magnetic motor system according to another embodiment of the present invention.
Figure 10:
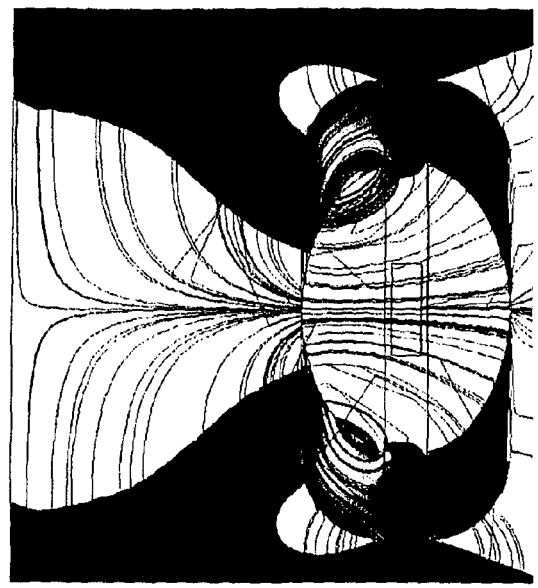

FIG. 10 shows the case where the magnets have a semicircular profile in the cross sectional plane. In this instance, the sloping sidewalls again provide for a flux trajectory in which magnetic lines of flux favour crossing the volume rather than shortcutting back to the same permanent magnet. Although a magnetic shortcut is still present, the energy dissipated in this shortcut is less than that where the side walls extend perpendicularly to the voice coil axis.

The magnetic shortcuts contribute to the losses in the magnetic circuit. Therefore, it can be seen that by providing sloped sidewalls, the motor system of the present invention provide an enhanced efficiency.

Figure 11:
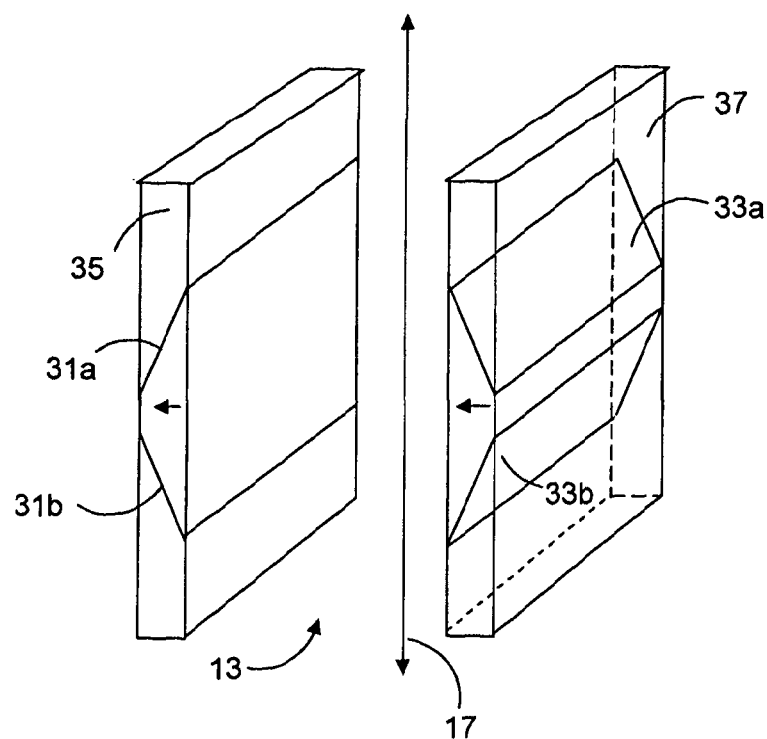
FIG. 11 shows a magnetic motor system according to an embodiment of the present invention in which the first and second parts are planar members.

FIG. 11 shows a magnetic motor system according to an embodiment of the present invention in which the first and second parts are planar members. The members have opposing walls which extend in a single, respective plane, for example. The members together define a volume 13 inside of which a voice coil may be received. In this example, the volume may be substantially cuboidal. When received in the volume, the voice coil is movable along the voice coil axis 17.

As can be seen in FIG. 11, each permanent magnet has first 31a, 33a and second 31b, 33b side walls that extend away from the volume. The permanent magnets may both be magnetised in the same direction. The permanent magnets may be magnetised in a direction that is perpendicular to the voice coil axis.

In the orientation shown in FIG. 11, in which the voice coil axis extends vertically, the first and second sidewalls define upper and lower faces of the permanent magnets. The first and second sidewalls are sloped towards one another, and are both, for example, inclined with respect to a second axis that passes perpendicularly to the voice coil axis.

Thus, where the first and second parts are planar members, the permanent magnets may be substantially prism shaped.

Figure 12:
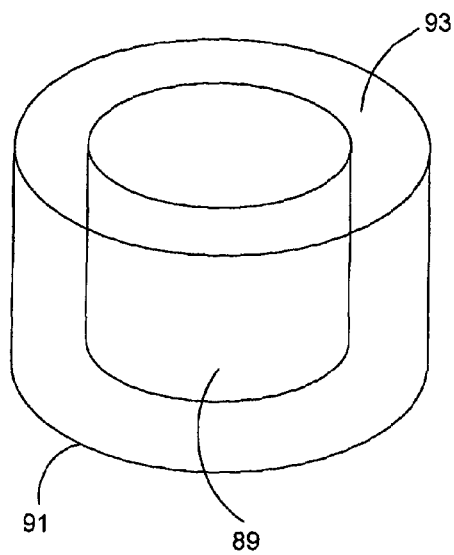
FIG. 12 shows a magnetic motor system according to another embodiment of the present invention in which the magnetic motor system has a circular geometry.

FIG. 12 shows a magnetic motor system according to another embodiment of the present invention. In this embodiment, the magnetic motor system has a circular geometry. The first and second parts, for example, define concentric cylindrical ring members 89, 91. For simplicity, FIG. 11 only shows the two opposing surfaces of the volume. The ring members are spaced apart to define an annular volume 93 between them. An annular voice coil may be received in the annular volume.

Figure 13:
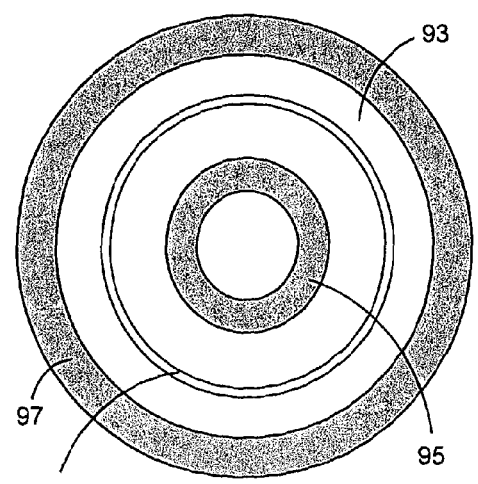
FIG. 13 shows a plan view of the magnetic motor system of FIG. 12.

FIG. 13 shows a plan view of the magnetic motor system of FIG. 11. In this embodiment, each ring member has a permanent ring magnet 95, 97. The two ring magnets are arranged, for example, with opposite poles facing one another across the annular volume 65. The permanent magnets are for example, polarized perpendicularly to the voice coil axis. The ring magnets are located, for example, within the ring members. An annular voice coil 99 may be received within the annular volume 65.

Figure 14:
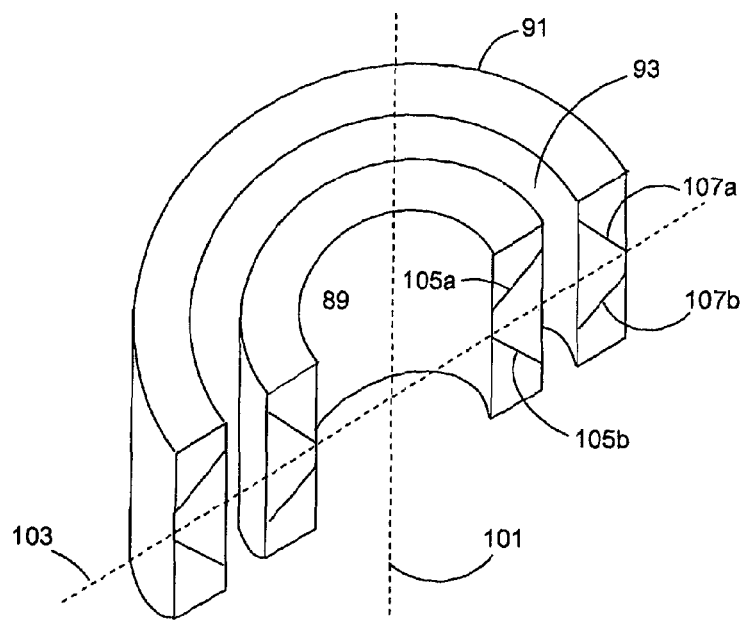
FIG. 14 shows a cutaway view of the magnetic motor system shown in FIGS. 12 and 13.

FIG. 14 shows a cutaway view of the magnetic motor system shown in FIGS. 12 and 13. The ring magnets 95, 97 extend around the circumference of each ring member 89, 91, for example.

When viewed in a plane defined by the voice coil axis of motion 101 and a radial axis 103 of the magnetic motor system (which axis may, for example, extend normal to the opposing faces of the ring members), the permanent ring magnets have first and second sidewalls 105a, 105b, 107a, 107b, that extend away from the volume. The first sidewall of each ring magnet slopes in a direction towards the second sidewall of the respective ring magnet, as it extends away from the annular volume. The sloped geometry of the permanent magnets may reduce the amount of leakage and/or magnetic short circuits, for example, and may result in a more efficient magnet construction.

FIG. 14 shows a plan view of a magnetic motor system according to another embodiment of the present invention. In this embodiment, the magnetic motor system has a circular geometry. The first and second parts, for example, define concentric circular inner and outer ring members. The ring members are spaced apart to define an annular volume 93 between them. An annular voice coil 99 may be received in the annular volume.

In this embodiment, each ring member has a series of discrete permanent magnets, which are, for example, spaced circumferentially around the ring members. Each permanent magnet 109 in the inner ring member is, for example, radially aligned with a respective permanent magnet 111 in the outer ring member, so that each permanent magnet faces a corresponding permanent magnet across the annular volume. Each one of the permanent magnets in the inner and outer ring member has first and second sidewalls that extend away from the volume. The first sidewall of each ring magnet slopes in a direction towards the second sidewall of the respective ring magnet, as it extends away from the annular volume. The sloped geometry of the permanent magnets may reduce the amount of leakage and/or magnetic short circuits, for example, and may result in a more efficient magnet construction.

As an example, a loudspeaker including a magnetic motor system according to the present invention with a circular geometry can be realized using the following parameter values:

Number of Turns of wire on voice coil: 52

Figure 1:
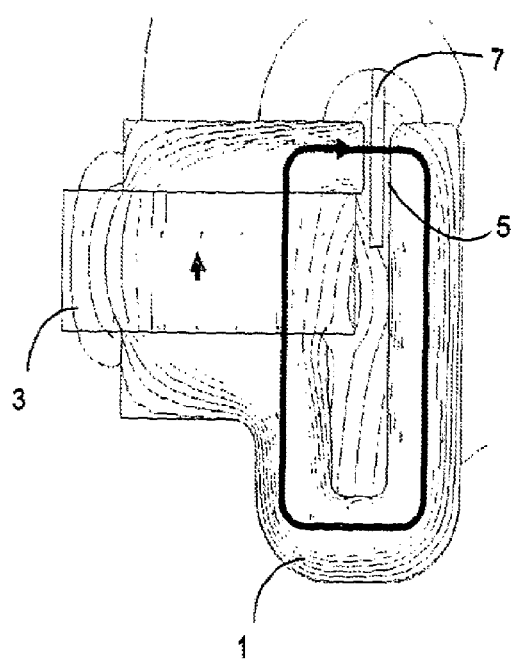
FIG. 1 shows a closed magnetic circuit in which a steel U-Yoke is used for guiding magnetic flux to an air gap in which a voice coil is received.
Figure 2:
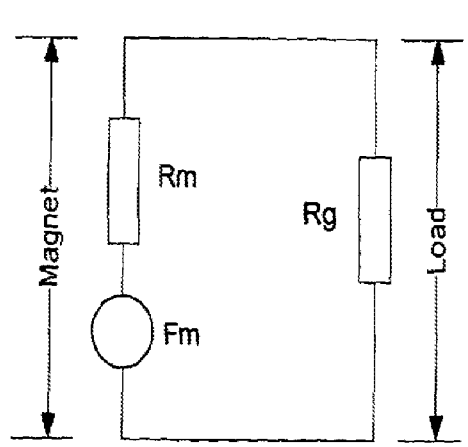
FIG. 2 shows a magnetic circuit representation of the circuit shown in FIG. 1.

Nominal Impedance of the Voice Coil: 3.6 Ohm
Type of material used for permanent magnets: neodymium
The Grade of the neodymium: N35
Number of turns of wire laid upon one another in the voice coil: 4, with 220 μm wire
Outer Diameter of the Magnet Structure: 32 mm
Inner Diameter of the Voice Coil: 24 mm
Height of the Voice Coil: 3 mm It is possible to calculate the magnetic force factor by integrating the horizontal component of the magnetic flux density (which is perpendicular to the voice coil axis) over the cross-sectional area of the voice coil, and multiplying the result with the length of the wire in the voice coil. In this example, the calculated force factor becomes 2.9 Tm. A similar magnetic motor system can be realized using a U-Yoke magnet principle as described in the prior art (as shown in FIG. 2, for example) to also provide a force factor of 2.9 Tm. However, the design requirements of the U-Yoke result in a motor system that is 44% heavier than when using the arrangement of permanent magnets having sloped sidewalls. In particular, in the present invention, the geometry of the permanent magnets and the guide members minimises the amount of ferromagnetic material required in order to efficiently channel magnetic flux to the air gap, helping to reduce the weight of the magnetic motor system.

In addition, the mechanical excursions, which both loudspeakers can make, are comparable; however, the present invention has the advantage of soft breaking by the help of reversing magnetic fields, resulting in a soft clipping at maximums, rather than hard breaking by means of mechanical limitations.

Figure 16:
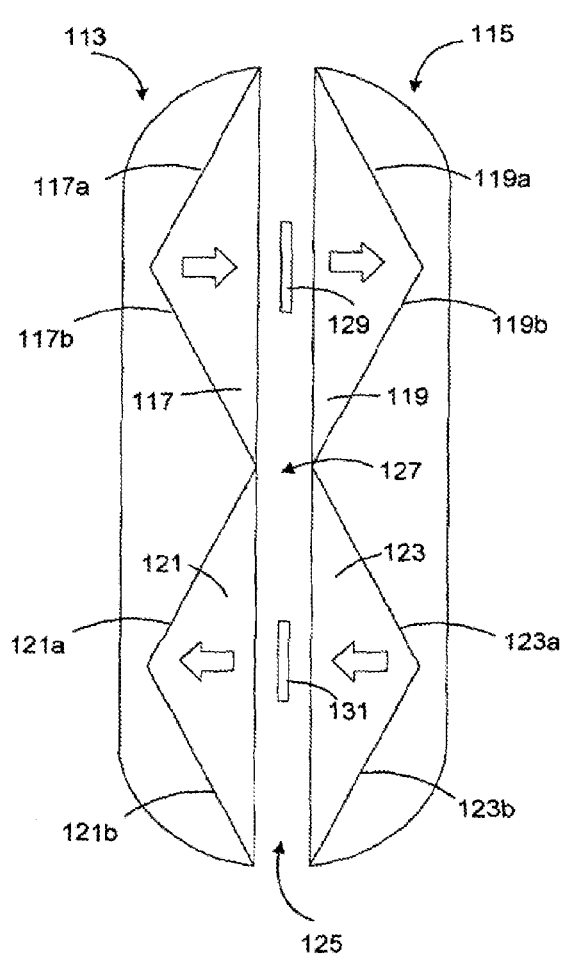
FIG. 16 shows a magnetic motor assembly according to another embodiment of the present invention.

FIG. 16 shows an embodiment of the present invention in which the first 113 and second 115 parts each have a first permanent magnet 117, 119, and a second permanent magnet 121, 123. The first and second permanent magnets are, for example, magnetised in a direction perpendicular to the voice coil motion axis. The first permanent magnets 117, 119 in each part are, for example, magnetised in the opposite direction to the second permanent magnets 121, 123 in each part. The first permanent magnets 117, 119 are, for example, disposed with opposite poles facing one another across the volume 125 between the two parts. The second permanent magnets 121, 123 are, for example, disposed with opposite poles facing one another across the volume 125.

Each of the first permanent magnets has first and second sidewalls 117a, 117b, 119a, 119b, 121a, 121b, 123a, 123b that extend in a direction away from the volume 125. The first and second sidewalls of each permanent magnet slope towards one another as they extend away from the volume. In this example, the first and second sidewalls of each permanent magnet are inclined by the same angle with respect to the voice coil axis.

A voice coil may be located in the volume between the first and second parts. The pairs of first and second permanent magnets are, for example, arranged symmetrically either side of the midpoint 127 of the voice coil's range of movement along its axis. The voice coil may have, for example, a rectangular winding profile. The voice coil has, for example, a first long edge 129 that is located between the first permanent magnets. The voice coil has, for example, a second long edge 131 that is located between the second permanent magnets. The coil windings may be arranged so that current passes through the first long edge of the voice coil in the opposite direction to that in which current passes through the second long edge of the voice coil. Since the first permanent magnets 117, 119 may be magnetised in the opposite direction to the second permanent magnets 121, 123, the magnetic field in which the first long edge is immersed may be polarised in the opposite direction to the magnetic field in which the second long edge is immersed. In the case where both the field and current direction is reversed for the second long edge compared to the first long edge, the first and second long edges will experience a mechanical force in the same direction as one another. The separation distance between the first and second magnets in each part can be set in accordance to the required excursion of the voice coil.

Figure 17:
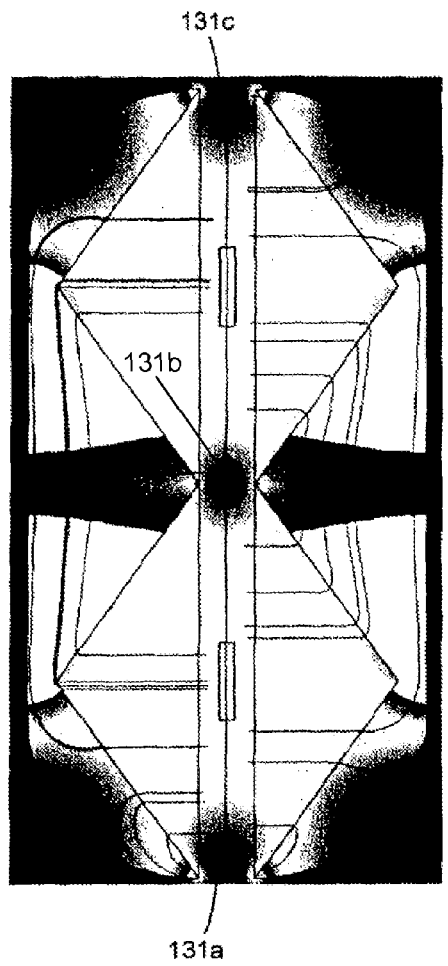
FIG. 17 shows a calculated magnetic flux density map for a magnetic motor system having the structure shown in FIG. 16.

FIG. 17 shows a calculated magnetic flux density map for a magnetic motor system having the structure shown in FIG. 16. The density map has regions 131a, 131b, 131c which are magnetic nulls, located at the midpoint of the structure, and the upper and lower extremes of the voice coil's range of movement.

In order to optimize the performance of a magnetic motor system, it is preferable that the magnetic flux density in the air gap should be uniformly distributed. This can be achieved by varying the gradient of the slope of the first and second side faces of each permanent magnet in the system. The optimum situation is achieved when the sum area of the two null regions 131a, 131b at the extremes is the same as that of the null region 131b in the middle. Or in other terms, the magnet structure can be called optimized if the extremes in the voice coil range of motion and the null regions are equidistant from each other.

FIG. 18 shows another embodiment of the present invention in which the first 113 and second 115 parts each have a first permanent magnet 117, 119, and a second permanent magnet 121, 123. Here, for example, each of the first permanent magnets 117, 119 has a first side wall 117a, 119a that has a larger gradient of slope with respect to the voice coil axis than does the second side wall 117b, 119b. In each second permanent magnet, the first side wall 121a, 123a may have a smaller gradient of slope with respect to the voice coil axis than does the second side wall 121b, 123b.

FIG. 19 shows a calculated magnetic flux density map for a magnetic motor system having the structure shown in FIG. 18. By changing the slope of the first and second side walls of each permanent magnet, the null regions positioned at the extremes of the voice coil's range of movement can be displaced towards the outside of the air gap, resulting in a higher average magnetic field strength in the air gap. A consequence of this is that the size of the middle null region may be increased compared to the case where the gradient of the slope is the same for both the first and second sidewalls of each permanent magnet.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

The invention claimed is:

1. A permanent magnetic motor system for driving a loudspeaker voice coil, the permanent magnetic motor system having:
   a first part and a second part,
   wherein the first and second parts are spaced apart to define a volume between the first and second parts for receiving the voice coil, the voice coil being movable along a voice coil axis,
   the first and second parts each having at least one respective permanent magnet, wherein all permanent magnets contained within the first part and the second part are magnetised in a direction perpendicular to the voice coil axis, the permanent magnets having respective faces that face towards one another across the volume, the permanent magnets being arranged with opposite poles facing one another across the volume, such that lines of magnetic flux pass across the volume from the face of one permanent magnet to the face of the other permanent magnet, each permanent magnet having first and second sidewalls that extend in a direction away from the volume, and which form upper and lower faces of the permanent magnet when the system is oriented with the voice coil axis being vertical, wherein the first sidewall slopes towards the second sidewall in a direction away from the volume, the first and second parts each having a respective guide member for channelling lines of magnetic flux in a return path from one permanent magnet to the respective opposing permanent magnet of the other part, wherein the guide members are not permanent magnets.

2. The permanent magnetic motor system according to claim 1, wherein the first and second side walls of each permanent magnet are not perpendicular to the voice coil axis.

3. The permanent magnetic motor system according to claim 1, wherein, when the system is viewed in a cross sectional plane defined by the voice coil axis and a second axis that extends from and is normal to the face of one of the permanent magnets, the first sidewall of each permanent magnet is inclined at an angle of between 45 and 75 degrees with respect to the second axis.

4. The permanent magnetic motor system according to claim 3, wherein the second sidewall of each permanent magnet is inclined at an angle of between 45 and 75 degrees with respect to the second axis.

5. The permanent magnetic motor system according to claim 1 wherein the guide members are formed from a ferromagnetic material whose magnetic permeability is such that the ferromagnetic material will adopt a magnetic configuration determined by the magnetic field of the permanent magnets, regardless of any previous magnetic configuration of the guide members.

6. The permanent magnetic motor system according to claim 1 wherein the first and second parts define inner and outer ring members arranged coaxially about the voice coil axis, and wherein the volume is an annular volume between the ring members.

7. The permanent magnetic motor system according to claim 6, wherein the permanent magnets are ring permanent magnets.

8. The permanent magnetic motor system according to claim 6, wherein the permanent magnet in the first part is one of a plurality of circumferentially spaced permanent magnets in the inner ring member, and the permanent magnet in the second part is one of a plurality of circumferentially spaced permanent magnets in the outer ring member, wherein each permanent magnet in the inner ring member is arranged facing a respective one of the permanent magnets in the outer ring member across the annular volume.

9. The permanent magnetic motor system according to claim 1, wherein the first and second parts are planar members.

10. The permanent magnetic motor system according to claim 3 wherein, when viewed in the cross sectional plane, each permanent magnet has a longest side that runs parallel with the voice coil axis.

11. The permanent magnetic motor system according to claim 1, wherein the permanent magnets are encased by the guide members.

12. The permanent magnetic motor system according to claim 1, wherein each of the guide members has a first portion that forms an interface with the first side wall of the permanent magnet, and a second portion that forms an interface with the second side wall of the permanent magnet, and wherein, in each part, the respective interfaces formed between the guide member and the first and second sidewalls have a combined surface area that exceeds the surface area of any other interface formed between a wall of the magnet and the guide member.

13. The permanent magnetic motor system according to claim 1, wherein the guide members have recessed portions for receiving an adhesive to bond the permanent magnets to the guide members.

14. The permanent magnetic motor system according to claim 12, wherein the first portions of each guide member are arranged to channel lines of magnetic flux in a first return path between the first side walls of each pair of facing permanent magnets, and the second portions of each guide member are arranged to channel lines of magnetic flux in a second return path between the second side walls of each pair of facing permanent magnets.

15. The permanent magnetic motor system according to claim 14, wherein the voice coil is received within the volume, the voice coil being movable along the axis between two extremes, wherein, at a midway point between the two extremes, the voice coil is situated between the opposing poles of the permanent magnets, and at the respective extremes, the voice coil intersects with the first and second flux return paths.

16. The permanent magnetic motor system according to claim 1, wherein the first and second parts each contain a respective second permanent magnet, the second permanent magnets being arranged with opposite poles facing one another across the volume, the second permanent magnets being polarised in an opposite direction to the first permanent magnets so that lines of magnetic flux channelled along the return path pass across the volume between the second permanent magnets.

17. The permanent magnetic motor system according to claim 16, wherein the second permanent magnets each have first and second side walls that extend in a direction away from the volume, and which define upper and lower faces of the second permanent magnets when the system is oriented with the voice coil axis being vertical, wherein the first sidewall of each second permanent magnet slopes towards the second sidewall of the respective second permanent magnet in a direction away from the volume, and wherein, when the system is viewed in the cross sectional plane, the first and second sidewalls of each permanent magnet are inclined at an angle of between 45 and 75 degrees with respect to the second axis.

18. The permanent magnetic motor system according to claim 1, wherein the first and second parts are wholly separated by the volume, such that lines of magnetic flux must pass through the volume to pass from the first part to the second part.

19. A loudspeaker having a permanent magnetic motor system according to claim 1.

* * * * *